United States Patent
Donoho, III (12)

(10) Patent No.: US 11,453,206 B1
(45) Date of Patent: Sep. 27, 2022

(54) WOVEN PLYWOOD AND A METHOD OF MANUFACTURING THE SAME

(71) Applicant: William E. Donoho, III, Arlington, TN (US)

(72) Inventor: William E. Donoho, III, Arlington, TN (US)

(*) Notice: Subject to any disclaimer, the term of this patent is extended or adjusted under 35 U.S.C. 154(b) by 0 days.

(21) Appl. No.: 17/508,948

(22) Filed: Oct. 22, 2021

Related U.S. Application Data (60) Provisional application No. 63/231,831, filed on Aug. 11, 2021, provisional application No. 63/166,212, filed on Mar. 25, 2021.

(51) Int. Cl.
| | |
|---|---|
| *B32B 21/13* | (2006.01) |
| *B27D 1/04* | (2006.01) |
| *B32B 3/14* | (2006.01) |
| *B32B 21/14* | (2006.01) |

(52) U.S. Cl.
CPC .............. *B32B 21/13* (2013.01); *B27D 1/04* (2013.01); *B32B 3/14* (2013.01); *B32B 21/14* (2013.01); *B32B 2479/00* (2013.01)

(58) Field of Classification Search
CPC ..... B32B 21/13; B32B 21/14; B32B 2479/00; B27D 1/04; B27J 1/02; B27J 1/003; Y10T 428/24066; Y10T 428/24074; Y10T 428/24091; Y10T 428/24099; Y10T 428/24107; Y10T 428/24116; Y10T 428/24132

USPC .................................................. 428/106, 107
See application file for complete search history.

(56) References Cited

U.S. PATENT DOCUMENTS

| | | | |
|---|---|---|---|
| 880,098 A * | 2/1908 | Robinson ................ | E04F 13/04 52/343 |
| 7,647,957 B2 | 1/2010 | Pasha et al. | |
| 2005/0108966 A1 * | 5/2005 | Jaeger ...................... | E04B 9/04 52/581 |

* cited by examiner

*Primary Examiner* — Catherine A. Simone
(74) *Attorney, Agent, or Firm* — Hulsey P.C.

(57) ABSTRACT

The present subject matter discloses a woven plywood and a method of manufacturing the same. The woven plywood can be created out of lower grade timber or logs than standard plywood. The woven plywood includes a first ply and a second ply. The first ply includes first vertical lamellas interwoven with first horizontal lamellas. The second ply includes second vertical lamellas interwoven with second horizontal lamellas. The lamellas are spaced in a manner that creates alternating openings in adjacent plies to that when they are laminated together, the overlapping sections of each plppy have an opening to receive the adjacent ply. Multiple plies are glued together into a sheet with appropriate thickness. The woven plywood is cold pressed to set the glue and hot pressed to cure the glue. The woven plywood is trimmed as per required length and width, and sanded for shipment.

10 Claims, 5 Drawing Sheets

WOVEN PLYWOOD AND A METHOD OF MANUFACTURING THE SAME

The present application claims the benefit of U.S. Provisional Application No. 63/231,831, filed Aug. 11, 2021 and U.S. Provisional Application No. 63/166,212, filed Mar. 25, 2021; all of which are incorporated herein by reference.

FIELD OF THE INVENTION

The present subject matter generally relates to a woven plywood. More specifically, the present subject matter relates to a woven plywood and a method of manufacturing the same, the woven plywood that can utilize a lower grade of timber than traditional plywood and provides use in construction, furniture, cabinet, shipping, and other industries.

BACKGROUND OF THE INVENTION

Production of wood products is essential to many industries such as construction, furniture, cabinet, shipping, and retail markets. Some of the industries use woven plywood made of bamboo and other cane or reed species as a construction and/or engineering material.

Several attempts have been made in the past that disclose use of plywood and the manufacturing the same. One such example is disclosed in a U.S. Pat. No. 7,647,957 entitled "Method for making plywood and dimensional lumber from *Arundo donax* L. or bamboo" (the "'957 Patent"). The '957 Patent discloses a method of producing a virtually fireproof plywood from perennial grasses such as *Arundo donax* Ligneous, various bamboo strains, or a blend thereof, by first weaving the stalks of these plants into a mat and then layering these mats and binding each layer with any one of several commercial resins mixed with potash for the purpose of enhancing the board's fire retardant quality. The result is the formation of a finished product with structural board attributes and an exceptionally high flash point in relation to other manufactured board products made from forest materials.

Currently, the only commercial markets for lower grade or smaller sized timber, in both hardwoods and softwoods, are end uses requiring the timber to be chipped. Examples include pulp markets for paper products, oriented strand board (OSB) mills, and chip mills for Medium-density fibreboard (MDF), wood pellets, etc. The above markets are unstable and prices for the standing timber and logs are typically extremely low, often making it not cost effective to harvest lower grade timber even when that is the most healthy decision for the forest. Additionally, some forests can't be logged at all as there is no outlet for lower grade timber in that area.

Therefore, there is a need for woven plywood that can take advantage of a large portion of lower grade timber and provide a plywood that is stronger and lighter than standard plywood and a typical OSB product, and less susceptible to moisture problems than OSB.

BRIEF SUMMARY OF THE INVENTION

It is an object of the present subject matter to provide a woven plywood made of a lower grade timber or logs and avoids the drawback of known standard plywood and/or OSB products.

It is another object of the present subject matter to provide a woven plywood made of layers being woven to provide a stronger plywood than a standard plywood.

In order to overcome the limitations here stated, the present subject matter provides a woven plywood and a method of manufacturing the same. The woven plywood comprises strips or lamellas made of any type of wood with suitable log sizes and stability. The timber is cut into horizontal lamellas and vertical lamellas. Both types of lamellas are stacked into perpendicular vertical chutes, with access to steam, that feed the lamellas into a weaving machine. One end of the weaving machine holds equally spaced vertical lamella ends flush and flat while the other end includes alternating articulating pins that raise alternating vertical lamellas creating an opening into which the horizontal lamellas are fed. This creates the ply with a woven checkerboard pattern with the spaced openings arranged to accommodate the adjacent ply. The full layer of the woven ply is then fed out of the weaving machine and into a dryer. The dryer dries the woven plies and the dried woven plies are glued appropriately and stacked upon each other forming a sheet with the appropriate number of layers to produce a woven plywood with suitable thickness for the desired application. In one example, the plies held in place by lugs or pins after the plies are woven and fed into the dryer. This is because; after the plies are woven and fed into the dryer, the lamellas tend to move, as all wood does when it is dried. Holding the plies in place by lugs or pins helps to overcome the above problem.

After producing, the woven plywood i.e., sheets are stacked into a cold press and pressed at the appropriate pressure for the appropriate amount of time for the glue to set. The pressed woven plywood is then set in hot presses for the final cure. Further, the woven plywood is trimmed to its final width and length and sanded as required.

In one advantageous feature of the present subject matter, the woven plywood can take advantage of a large portion of lower grade timber and logs as its' structural parts are smaller than normal plywood layers. Also, being woven, the woven plywood is stronger and lighter than a standard plywood or a typical OSB product. Additionally, Woven Plywood uses less glue and the finished product contains less wood than either traditional plywood or OSB.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

The detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed woven plywood. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed woven plywood.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present subject matter encompasses present and future known equivalents to the known components referred to herein by way of illustration.

Although the present subject matter describes a woven plywood, it is to be further understood that numerous changes may arise in the details of the embodiments of the woven plywood. It is contemplated that all such changes and additional embodiments are within the spirit and true scope of this subject matter.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the subject matter and are not intended to limit the scope of the subject matter.

It should be understood that the present subject matter describes a woven plywood that can not only be created out of standard peeler grade logs, but also out of lower grade logs typically used for pulp or OSB. The woven plywood includes a first ply and a second ply. The first ply includes first vertical lamellas and first horizontal lamellas. The second ply includes second vertical lamellas and second horizontal lamellas. The first horizontal lamellas are woven into the first vertical lamellas with the help of a weaving machine in a manner that creates first openings for receiving intersection of the second vertical lamellas and the second horizontal lamellas. Multiple plies are glued together into a sheet to form the woven plywood of suitable thickness and strength for the desired application. The woven plywood is first cold pressed to set the glue. Then hot pressed to cure the glue. The woven plywood is trimmed as per required length and width, and sanded for shipment.

Various features and embodiments of the woven plywood and the method of manufacturing the same are explained in conjunction with the description of FIGS. 1 to 10.

In one embodiment, the present subject matter discloses a woven plywood and a method of manufacturing the same. In one exemplary embodiment, Southern Yellow Pine timber is selected to manufacture the woven plywood. In another exemplary embodiment, Oak is selected to manufacture the woven plywood. In another exemplary embodiment, Cottonwood is selected to manufacture the woven plywood. In another exemplary embodiment, low grade mixed species of hardwood timber is selected to manufacture the woven plywood. The species include, but are not limited to, Oak, Ash, Cherry, Maple, Pine, Larch, Spruce, Fir, Sycamore, Gum, Cottonwood, Birch, Alder, Aspen, Beech, Basswood, Tulipwood, *Eucalyptus*, Rubberwood, Palm, Poplar, Hickory, Pecan, Walnut, Elm, Hemlock, Cedar, Willow, Cypress, Redwood, Southern Yellow Pine, Eastern White Pine, *Ponderosa* Pine, *Radiata* Pine, Scots Pine, Scotch Pine, Baltic Pine, Caribbean Pine, Slash Pine, Mediterranean Pine, Brazilian Pine, Lodgepole Pine, Chilean Pine, and *Eucalyptus*.

Upon selecting the timber or logs, the logs are purchased down to a size, e.g., a 4" top. The logs are fed into a mill through a metal detector and a debarker. Here, the logs are cut to the appropriate length and sorted by their length and diameter. Subsequently, the cut logs are sent to appropriate rough mill or peeler. The logs, if being sawn and not peeled, are squared up into cants at each appropriate mill. At this point, the cants are sent to resaws or frame saws to saw the lamella blanks to the appropriate thickness(es). In one example, the lamella blanks have a thickness of 1/8". In another example the lamella blanks have a thickness of 5/32. Considering the thickness(es) between 1/16"-9/32", the lamella blanks are then cut to appropriate width of between 1"-6". These lamellas will be woven into plies to form a woven plywood. If peeled, the veneers will then be cut into strips or lamellas that will be woven into plies to form woven plywood. A person skilled in the art understands that the above specified dimensions are exemplary in nature and may vary depending on the need. Modifications to the above dimensions do not limit the scope of the present subject matter.

The lamellas are then stacked horizontally into vertical chutes, potentially with access to steam, that feeds the lamellas into a weaving machine. One end of the weaving machine holds the ends of the vertical lamellas flush and flat while the other end includes alternating articulating pins and/or hooks raising and lowering alternating vertical lamellas that create an opening into which the cross (horizontal) lamellas are fed. This creates a single ply of woven plywood. The full woven plies are then fed out of the weaving machine and into a dryer and conditioner. The dried and conditioned plies are then glued appropriately and laid into a sheet with the appropriate number of layers for the plywood thickness being produced. The sheets are then stacked into a cold press and pressed at the appropriate pressure for the appropriate amount of time for the glue to get its initial set. The pressed sheets are then individually set in hot presses for the final cure. Subsequently, the sheets are then trimmed to their final width and length and sanded as required. Further, the sheets are packaged in bundles and prepared for shipment.

Figure 1:
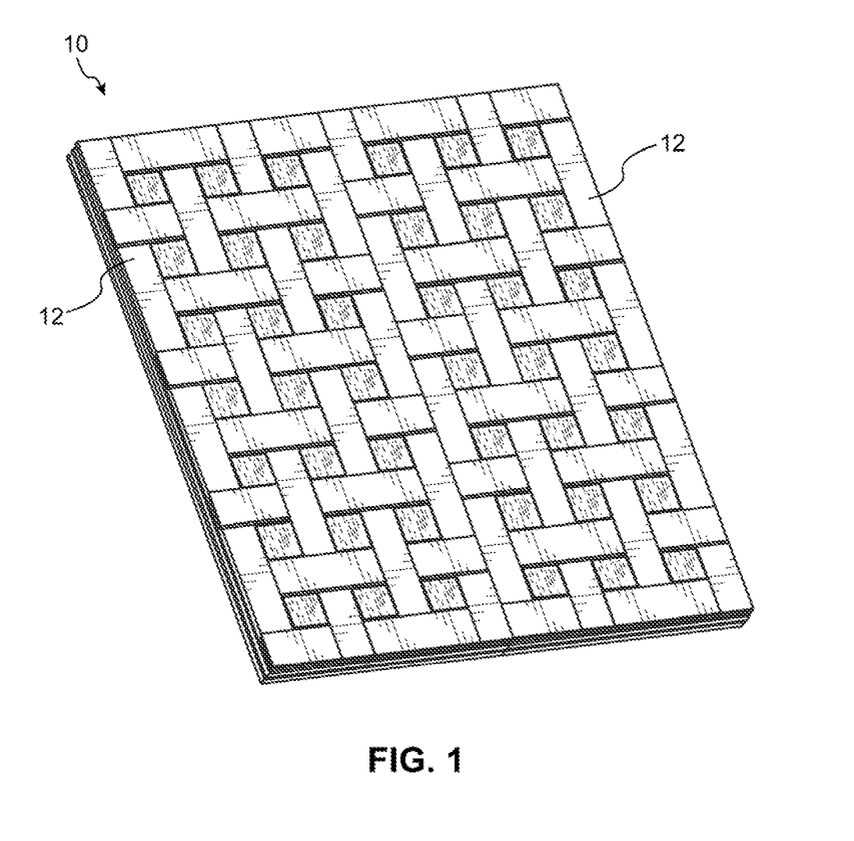
FIG. 1 illustrates an environment of two woven plywood sheet placed next to each other that were formed using lower grade timber, in accordance with one exemplary embodiment of the present subject matter.

FIG. 1 shows an environment 10 of woven plywood 12 placed next to each other that were formed using lower grade timber, in accordance with exemplary embodiment of the present subject matter. However, a person skilled in the art understands that woven plywood 12 can be manufactured in a variety of configurations depending on the need and size of woven plywood 12.

Figure 2:
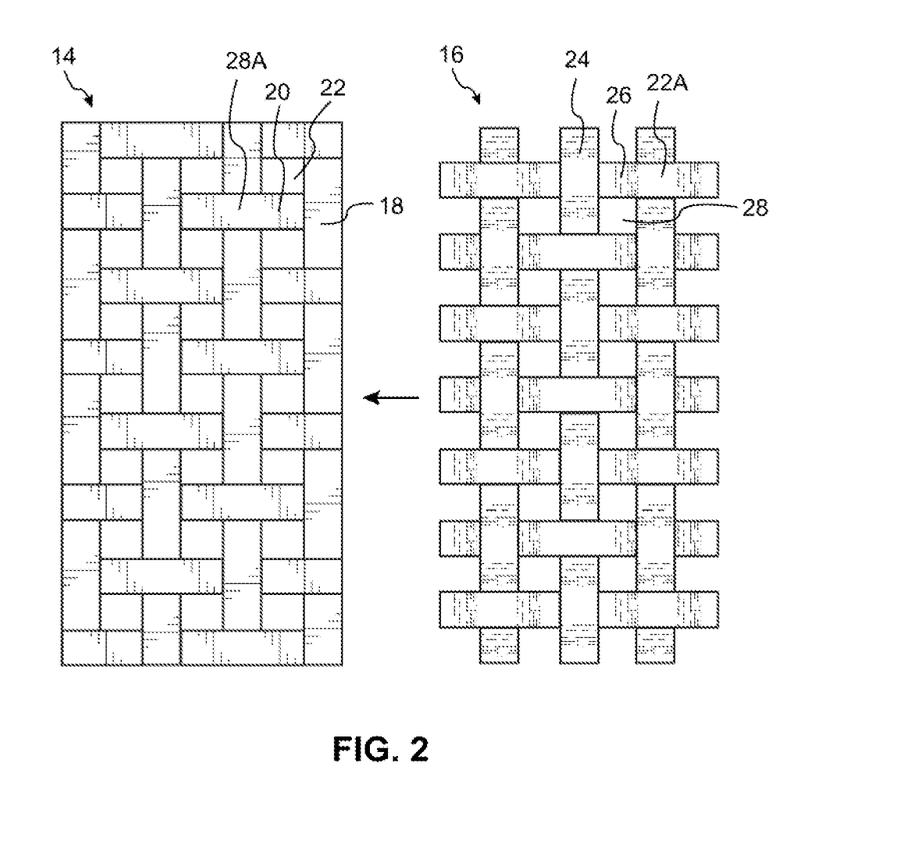
FIG. 2 illustrates adjacent plies of woven plywood.
Figure 3:
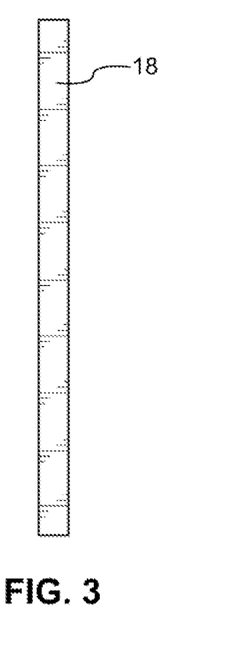
FIGS. 3 to 6 illustrate vertical lamellas and horizontal lamellas, in accordance with one exemplary embodiment of the present subject matter.
Figure 5:
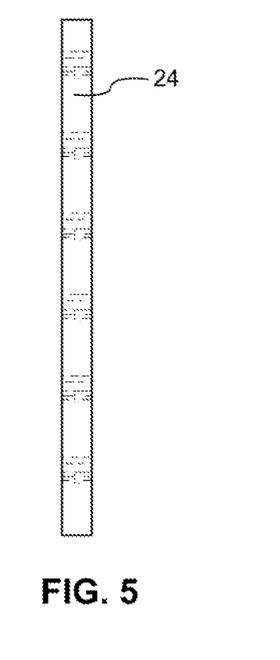

FIG. 2 illustrates construction of woven plywood 12, in accordance with one embodiment of the present subject matter. Woven plywood 12 includes first ply 14 and second ply 16. Each of first ply 14 and second ply 16 provides a material made of lower grade timber and logs. First ply 14 encompasses first vertical lamellas 18 and first horizontal lamellas 20 that are cut in a rectangular configuration. However, a person skilled in the art understands that first vertical lamellas 18 and first horizontal lamellas 20 can be cut into any shape and size with suitable thickness and width depending on the need. Each of first vertical lamellas 18 and first horizontal lamellas 20 are weaved to form a single ply. FIGS. 3 and 5 show front views of first vertical lamella 18 and first horizontal lamella 20, respectively that were cut into thin strips of suitable length, width and thickness. In one example, first vertical lamella 18 is cut longer than first horizontal lamella 20.

Figure 4:
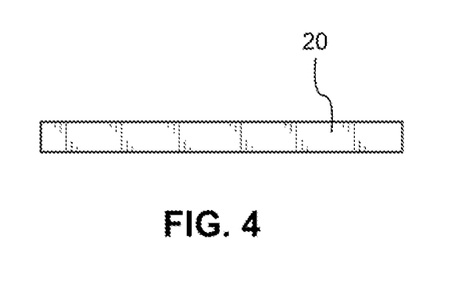
Figure 6:
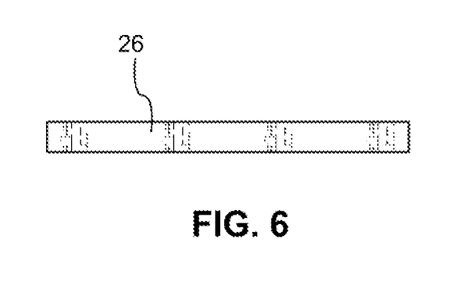

Similarly, second ply 16 encompasses second vertical lamellas 24 and second horizontal lamellas 26 that are cut in a rectangular configuration. However, a person skilled in the art understands that second vertical lamellas 24 and second horizontal lamellas 26 can be cut into any shapes and sizes with suitable thickness and width depending on the need. Each of second vertical lamellas 24 and second horizontal lamellas 26 are weaved to form a single ply. FIGS. 4 and 6 show front views of second vertical lamellas 24 and second horizontal lamellas 26, respectively that were cut into thin strips of suitable length, width and thickness. In one example, second vertical lamella 24 is cut longer than second horizontal lamella 26.

In accordance with the present subject matter, first horizontal lamellas 20 are woven into first vertical lamellas 18, as shown in FIG. 2. Note openings 22 between first vertical lamellas 18 and first horizontal lamellas 20 are formed into which the second panel 16 overlaps i.e., 22A, second vertical lamellas 24 and second horizontal lamellas 26 go into.

Similarly, second horizontal lamellas 26 are woven into second vertical lamellas 24, as shown in FIG. 2. Note openings 28 between second vertical panels 24 and second horizontal panels 26 are formed into which the first ply 14 overlaps i.e., 28A, first vertical lamellas 18 and first horizontal lamellas 20 go into.

Woven plies are then fed out of the weaving machine and into a drier and subsequent conditioner. The above process is repeated until a required number of full woven layers of first ply 14 and second ply 16 are produced and dried.

Figure 7:
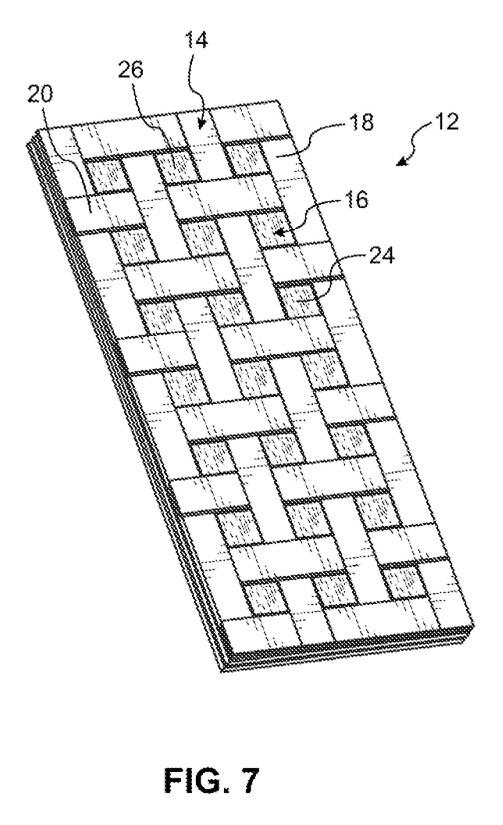
FIGS. 7 and 8 show a perspective view and a front view, respectively of the woven plywood including multiple layers glued together to form a sheet of suitable thickness, in accordance with one exemplary embodiment of the present subject matter.
Figure 8:
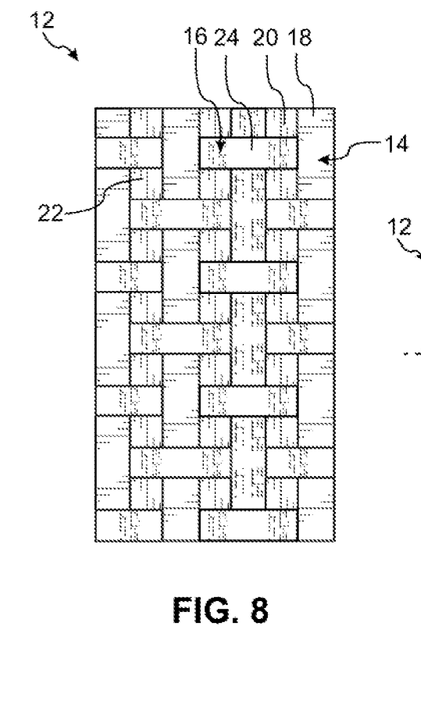
Figure 9A:
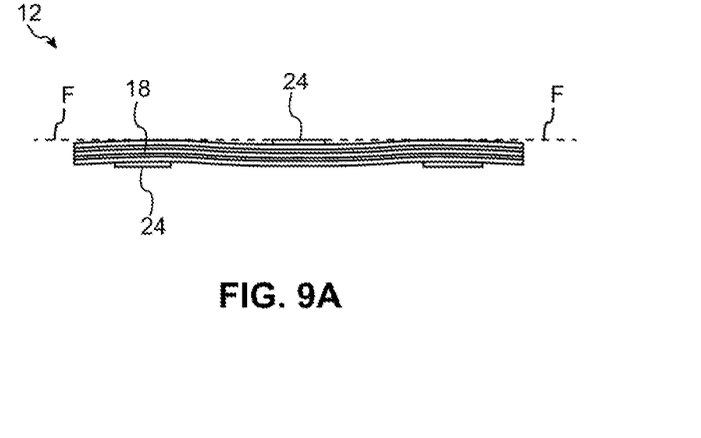
FIGS. 9A and 9B show a side view and an edge view of pressed sheets, in accordance with one exemplary embodiment of the present subject matter.
Figure 9B:
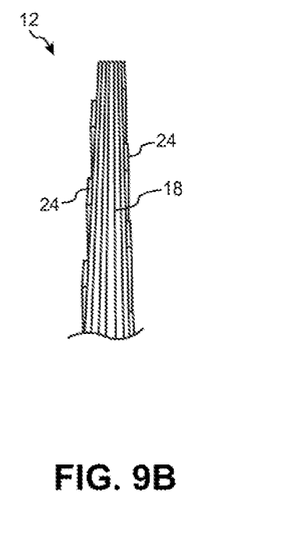
Figure 9C:
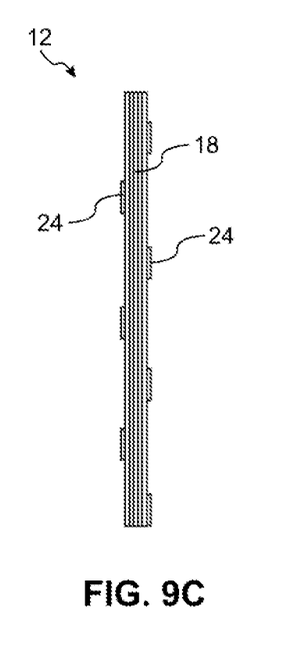
FIG. 9C shows a side view of the woven plywood including multiple layers glued together to form a sheet of suitable thickness, in accordance with one exemplary embodiment of the present subject matter.

Subsequently, multiple layers of first plies 14 and second plies 16 are glued/bonded together into a sheet of woven plywood 12 with appropriate thickness. FIGS. 7, 8, and 9C show a perspective view, a front view and a side view, respectively of woven plywood 12 including layers of first ply 14 and second ply 16 glued together to form a sheet of suitable thickness. Further, FIGS. 9A and 9B show the feature of sheets that are pressed and having some curvature within the sheet. Specifically, FIG. 9A shows a feature of woven plywood 12 which is flush and flat (represented as F) when placed on a surface such as table or ground, for example. Woven plywood 12 having layers of first plies 14 and second plies 16 are stacked into a cold press where appropriate pressure is applied for appropriate time for the glue to set in. Subsequently, first plies 14 and second plies 16 are sent for hot pressing for the final cure. This ensures the layers of first plies 14 and second plies 16 are firmly held in place. After the final cure, woven plywood 12 is trimmed as per required length and width, and sanded. Further, woven plywood 12 is packed for shipment.

A person skilled in the art understands that woven plywood 12 having multiple layers of laminated first plies 14 and second plies 16 of suitable thickness creates a better plywood out of lower grade timber. The presently disclosed woven plywood takes advantage of having a large portion of lower grade timber and logs as its' structural parts are smaller than normal plywood layers. Also, being woven, the woven plywood is as stronger than standard plywood and a typical OSB product.

Additionally, the presently disclosed woven plywood incorporates a smaller amount of actual wood with increased strength, and significantly less weight.

The presently disclosed woven plywood can be used as a decorative article as the woven plywood is stronger and lighter than ordinary plywood. In one exemplary embodiment, a ¾" thick woven Plywood presents approximately 60% stronger and 16% lighter than either a traditional plywood or an OSB product in the same thickness class. Furthermore, the presently disclosed woven plywood can effectively be used in as a concrete form due to its strength.

The presently disclosed woven plywood has applications in structural, packaging, and decorative applications. Further, the presently disclosed woven plywood can be used in construction, furniture, cabinet, shipping, and retail markets.

In one exemplary embodiment, woven plywood 12 i.e., layers of the first panels and/or the second panels are assembled but not pressed, as shown in FIG. 9C. Here, the layers of first plies 14 and/or second plies 16 are assembled (e.g., they are glued) but unpressed such that it is not finished product ready to shipped, as shown in FIGS. 8, 9A, 9B and 9C, for example.

A person skilled in the art understands that lamellas have different thickness and width depending on the need. In one example, the lamellas come with a thickness of ⅛" and a width of 2". In the present illustrations, the total size of the plies and sheets have width and length of 14"×30". However, the finished sheets will be manufactured in typical plywood and OSB width and length dimensions.

Figure 10:
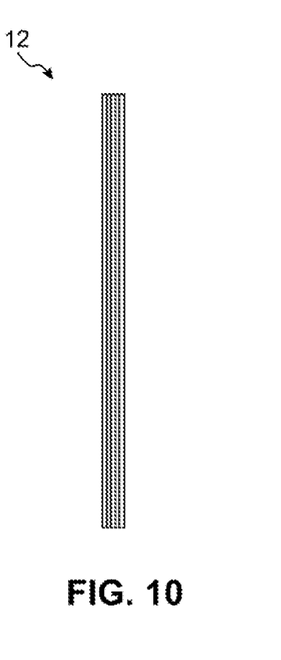
FIG. 10 shows a side view of the woven plywood with a woven core and solid veneer outer plies, in accordance with one exemplary embodiment of the present subject matter.

In another exemplary embodiment, the presently disclosed woven plywood is used as a core material. In other words, the woven plywood is sandwiched between layers of solid sheet of veneer. Here, the inner plies of a sheet would be made of woven plywood and the outer two plies would be of a solid sheet of veneer. The above constructional feature is advantageous at times to use Wovenply plywood as the core and layer a sheet of veneer on both faces to retain most of the strength of Wovenply and add the smoothness of regular plywood and OSB. Considering an example as shown in FIG. 10, the inner plies of a sheet would be made of woven plywood and the outer two plies would be of a solid sheet of veneer.

Wovenply helps to increase the supply of building materials. For example, the presently disclosed Wovenply plywood allows to mass produce on a large scale and easily replaces or interchanges either traditional plywood or OSB. The primary raw material for traditional plywood will typically be out of a bigger and more expensive log, whereas the lamellas used to manufacture Wovenply are much smaller than the veneer sheets of traditional plywood, smaller and lower grade logs can be used to produce these lamellas both reducing the cost of the raw material and allowing access to a bigger pool of raw material. While Wovenply uses the same raw material as OSB, the finished product of fully woven Wovenply contains less raw material than either of the other two products with superior strength and reduced weight.

Since the Wovenply uses small and relatively short pieces, it will enjoy as good of a yield as possible out of this smaller timber. The smaller amount of wood contained in a finished sheet of Wovenply, there are a few other benefits. Since the weight is reduced, the burden of shipping will also be reduced. More sheets on a truck means less fuel is used to transport the product. The additional strength allows for longer spans or thinner sheets to be used in the future in place of the thicknesses currently required for the specified load capacity. Also, with an appropriately designed plant, it should be nearly energy independent with a large boiler and cogeneration plant. The bark waste will be mixed with the sawdust that is created to fuel the boiler and drive the generator that will provide at least a portion of the electricity needs of the plant. Also, because of the design of the product and its interlocking nature, less glue or adhesive is used when compared to traditional plywood or OSB.

In one example, the present disclosure presents a machine to manufacture the woven plywood. The machine has specifications such as nominal finished weave dimensions of 48"×96" with a typical slat size of 1/8" thickness, 1 7/8" width, and length of 48" or 96". The nominal conveyor height of 30" from floor. The feed conveyor rate is adjustable up to 60 FPM. The cycle time is about 5 seconds per station for 5500 weaves for about 8 hours. The machine includes a control system having a PLC, sensors, pneumatics, servos, and gear motors. The machine is installed with standard plug connectors outside of control system.

In order to operate the machine, at first, green Slats are processed to finished size on independent equipment and then fed into the weaving machine. Both 4 ft and 8 ft length slats are delivered to the line feed areas by forklift, operator, debunking equipment, etc. Subsequently, each plywood weave of 4 ft by 8 ft overall finished dimensions are considered. Multiple weaves are stacked together in alternating orientation and laminated to create overall desired sheet thickness by a downstream process. Further, the Oft slats are loaded as a single layer with wide side leading onto a slip chain conveyor. Here, the slats move forward with an alignment guide to justify narrow edge of slats and continue until reaching a fixed stop. The Oft slats are then transferred perpendicularly with narrow side leading onto roller stations where fencing guides will align 24 slats while maintaining 2-inch separation between each slat as it moves into a raised stop for fixed positioning into the Weave Lock station. Once all slats are in position at the Weave Lock station stop, a top clamp will hold the 24 slats in position at the Weave Lock station at the downstream position. Subsequently, the 8 ft slats are loaded as a single layer with wide side leading onto a conveyor adjacent the Weave Lock station by an independent process.

The Weave Lock station begins the weave with 3 of the 8 ft slats into the 24 base slats. With the 24 base slats held in position with the top clamp and against the stop, the weave process begins. The first 8 ft slat drops down. Further, guides press up/down on alternating Oft slats to create an opening for the 8 ft slat to be inserted. Here, stops raise behind the 8 ft slat and then push forward to the 10" position into the alternating Oft openings. The guides then alternate to the weave for the 6" and 2" position for the 8 ft slat to be inserted. Further, the guides retract from the weave and the end stop lowers below the main conveyor rollers to allow the lattice assembly to move into the next station i.e., Weave Lock station.

In Weave Lock station, once lattice assemblies start, they move forward in the 8 ft width leading to in-line weaving continuous motion. The Weave Lock station includes overhead narrow rollers positioned at each station in alternating rows for odd or even rows and the opposite row supports flat in motion. The rollers extend down to force the leading end of 4 ft slats down underneath an 8 ft slat presented on a retractable stop, and the supports hold the alternating rows up to go over the 8 ft slat. The lattice assembly drives into the new slat to the correct position, the overhead rollers retract up and the stop retracts down to allow the lattice to exit the station. This process continues through identical stations until all remaining 8 ft slats are inserted into the lattice. The fully assembled lattice exits the final weaving station presented onto a slip chain conveyor for downstream processing.

At the outfeed, the plywood weave exits the final station onto a set of rollers in the 8 ft width leading to be presented to the next process.

A person skilled in the art appreciates that the woven plywood may come in a variety of sizes depending on the need. Further, different materials in addition to or instead of materials described herein may also be used and such implementations may be construed to be within the scope of the present subject matter. Further, many changes in the design and placement of components may take place without deviating from the scope of the presently disclosed woven plywood.

In the above description, numerous specific details are set forth such as examples of some embodiments, specific components, devices, methods, in order to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the subject matter, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. It is contemplated that additional embodiments are within the spirit and true scope of the disclosed subject matter.

What is claimed is:

1. A woven plywood, comprising:
   first vertical lamellas and first horizontal lamellas, wherein said first vertical lamellas and said first horizontal lamellas are weaved to form a layer of first ply with first openings; and
   second vertical lamellas and second horizontal lamellas, wherein said second vertical lamellas and said second horizontal lamellas are weaved to form a layer of second ply with second openings;
   wherein said second openings of said second ply receive intersection of said first ply at said first openings, such that said first ply goes into and overlaps said second ply, and wherein multiple layers of said first plies and said second plies are stacked and pressed to form a sheet of woven plywood; comprises layers of solid sheet of veneer sandwiching said woven plywood.

2. The woven plywood of claim 1, wherein an even number of said first ply and said second ply form a flush and flat surface upon pressing.

3. The woven plywood of claim 1, wherein an odd number of said first ply and said second ply form a flush and flat surface upon pressing.

4. The woven plywood of claim 1, wherein each of said first vertical lamellas and said first horizontal lamellas have same thickness.

5. The woven plywood of claim 1, wherein each of said first vertical lamellas and said first horizontal lamellas have different thickness.

6. The woven plywood of claim 1, wherein each of said second vertical lamellas and said second horizontal lamellas have same thickness.

7. The woven plywood of claim 1, wherein each of said second vertical lamellas and said second horizontal lamellas have different thickness.

8. The woven plywood of claim 1, wherein said first ply is made using one of Southern Yellow Pine timber, Oak, and Cottonwood.

9. The woven plywood of claim 1, wherein e said second ply is made using one of Southern Yellow Pine timber, Oak, and Cottonwood.

10. The woven plywood of claim 1, wherein each of said first vertical lamellas, said first horizontal lamellas, said second vertical lamellas and said second horizontal lamellas are cut in a rectangular configuration.

\* \* \* \* \*